(12) United States Patent
Burcham

(10) Patent No.: US 9,756,846 B2
(45) Date of Patent: Sep. 12, 2017

(54) RESONATING STRIKER FOR GAME CALL

(71) Applicant: Gregory S. Burcham, Falkville, AL (US)

(72) Inventor: Gregory S. Burcham, Falkville, AL (US)

(73) Assignee: EBSCO Industries, Inc., Birmingham, AL (US)

(*) Notice: Subject to any disclaimer, the term of this patent is extended or adjusted under 35 U.S.C. 154(b) by 0 days.

(21) Appl. No.: 14/866,220

(22) Filed: Sep. 25, 2015

(65) Prior Publication Data
US 2016/0088830 A1  Mar. 31, 2016

Related U.S. Application Data

(60) Provisional application No. 62/058,054, filed on Sep. 30, 2014.

(51) Int. Cl.
A01M 31/00 (2006.01)

(52) U.S. Cl.
CPC ................. A01M 31/004 (2013.01)

(58) Field of Classification Search
CPC ................. A01M 31/004; A63H 5/00
See application file for complete search history.

(56) References Cited

U.S. PATENT DOCUMENTS

| 427,274 | A | * | 5/1890 | Sherman | A63H 5/00 446/422 |
| 479,636 | A | * | 7/1892 | Droop | G10D 13/006 446/422 |
| 1,034,307 | A | * | 7/1912 | Saunders | A63H 1/32 43/2 |
| 2,025,181 | A | * | 12/1935 | Simon | A63H 5/00 446/397 |
| 4,127,053 | A | * | 11/1978 | Cohen | G10D 13/06 446/422 |
| 4,648,852 | A | * | 3/1987 | Wingate | A01M 31/004 446/397 |
| 4,904,221 | A | * | 2/1990 | Taylor | A01M 31/004 446/397 |
| 4,941,858 | A | * | 7/1990 | Adams | A01M 31/004 446/397 |
| 5,234,368 | A | * | 8/1993 | Carraway | A01M 31/004 446/202 |
| 5,716,254 | A | * | 2/1998 | Bowes | G10K 3/00 446/397 |
| 5,813,899 | A | * | 9/1998 | Hartley | G10K 3/00 446/422 |
| 5,921,842 | A | * | 7/1999 | Allenby | A01M 31/004 446/397 |
| 6,149,492 | A | * | 11/2000 | Davis, Jr. | A01M 31/004 446/202 |
| 6,231,418 | B1 | * | 5/2001 | Hancock | A01M 31/004 446/207 |

(Continued)

Primary Examiner — Michael Dennis
Assistant Examiner — Urszula M Cegielnik
(74) Attorney, Agent, or Firm — Veal Intellectual Property, LLC

(57) ABSTRACT

A game call striker utilizes a hollow axially opening counter weight to its striker shaft as a chamber within which a weight supported on an axially extending resilient member is mounted in axial alignment with the striker shaft and in non-contacting relation to the walls of said chamber.

16 Claims, 2 Drawing Sheets

(56) References Cited

U.S. PATENT DOCUMENTS

| | | | | |
|---|---|---|---|---|
| 6,283,817 B1* | 9/2001 | Kawaguchi | ............... | A63H 3/31 |
| | | | | 446/297 |
| 6,669,529 B1* | 12/2003 | Scaries | ............... | A01M 31/004 |
| | | | | 446/397 |
| 6,736,695 B1* | 5/2004 | Hoch | ............... | A63H 5/00 |
| | | | | 446/397 |
| 6,739,282 B1* | 5/2004 | Yuan | ............... | G10K 1/071 |
| | | | | 116/148 |
| 2010/0216371 A1* | 8/2010 | Cubbedge | ............... | A01M 31/004 |
| | | | | 446/418 |
| 2011/0201248 A1* | 8/2011 | Bean | ............... | A01M 31/004 |
| | | | | 446/418 |

* cited by examiner

RESONATING STRIKER FOR GAME CALL

The present invention claims priority from provisional patent application Ser. No. 62/058,054 filed Sep. 30, 2014.

FIELD OF INVENTION

The present invention relates to a game call and more particularly to a turkey call and in even greater particularity to an improved striker for a friction type call.

BACKGROUND

Hunters use a variety of mechanical devices to mimic the sounds that game animals make. This mimicry is intended to entice an animal into range for the hunter to see the animal and decide whether to attempt to take the animal. Consequently, hunters and game call makers are constantly trying to make the mimicry more appealing to the game animal. Among the game animals enticed by the widest number of different types of calls made by hunters is the wild turkey. Turkey calls come as friction calls including box calls and pot calls, mouth calls, pre-recorded calls, reed calls and probably a few more, each trying to get the right pitch, tone, and repetitiveness to entice a gobbler within range. Each of the forgoing have limitations and advantages when compared to each other. Most of the limitation is concerned with the vibratory quality of the materials used to mimic the sound.

SUMMARY OF THE INVENTION

The general object of the invention is to improve the vibratory quality of the sound created by the use of a striker and a pot or slate call.

In one embodiment, the improvement utilizes a secondary vibrating member within the striker to create an additional vibratory wave source which enhances the sound made when the striker is drawn across the plate of the call. More specifically, as the striker and plate vibrate in response to relative movement between themselves and the amount of pressure applied during this movement by the hunter, the striker transmits the vibration to the secondary wave source which vibrates as well, thereby enhancing the overall vibratory effect.

BRIEF DESCRIPTION OF THE DRAWINGS

Referring to the drawings which are appended hereto and which form a portion of this disclosure, it may be seen that.

DETAILED DESCRIPTION

Figure 1:
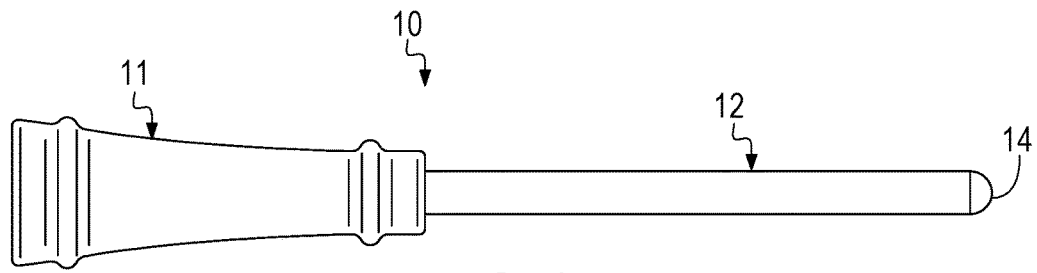
FIG. 1 is a side elevational view of the striker.
Figure 2:
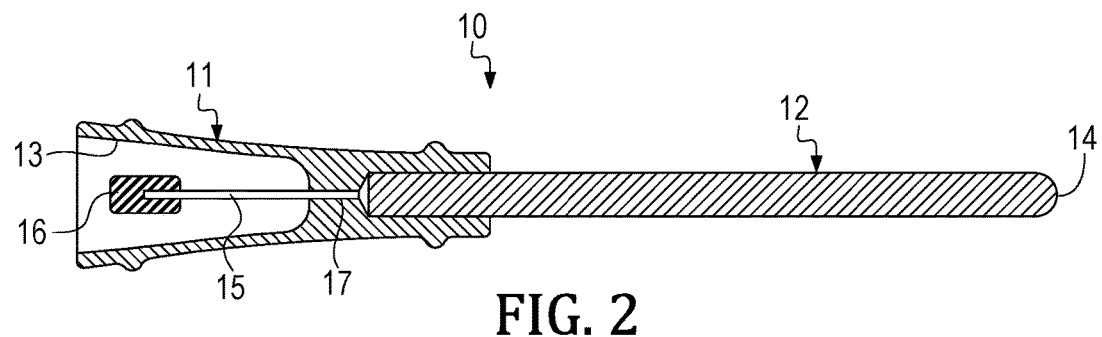
FIG. 2 is sectional view of a striker including the secondary vibratory wave source.
Figure 3:
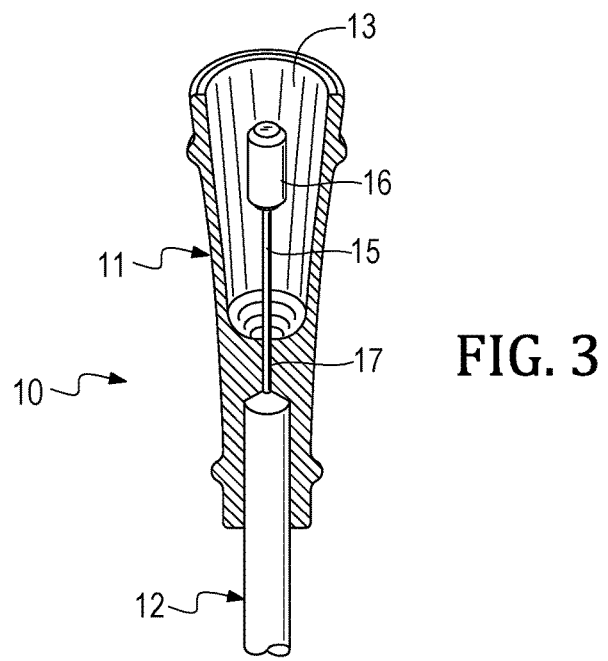
FIG. 3 is a top sectional view of a striker including the secondary vibratory wave source.
Figure 4:
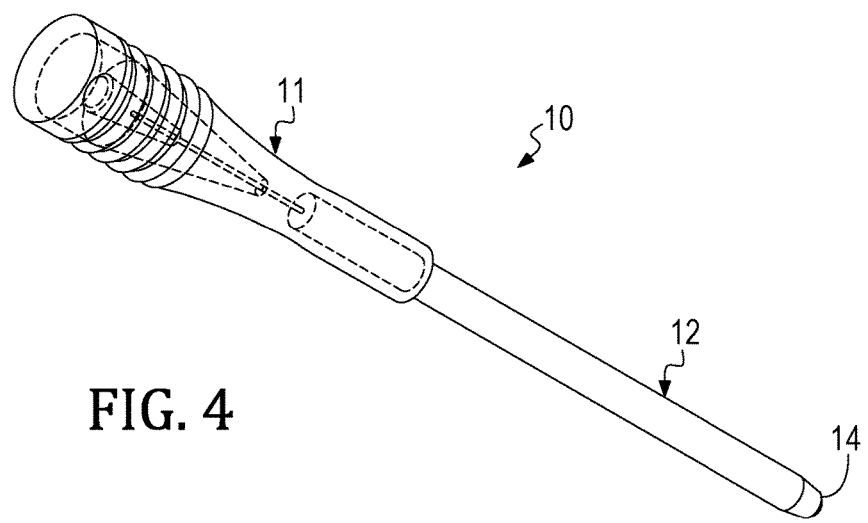
FIG. 4 is a perspective view of a second embodiment.
Figure 5:
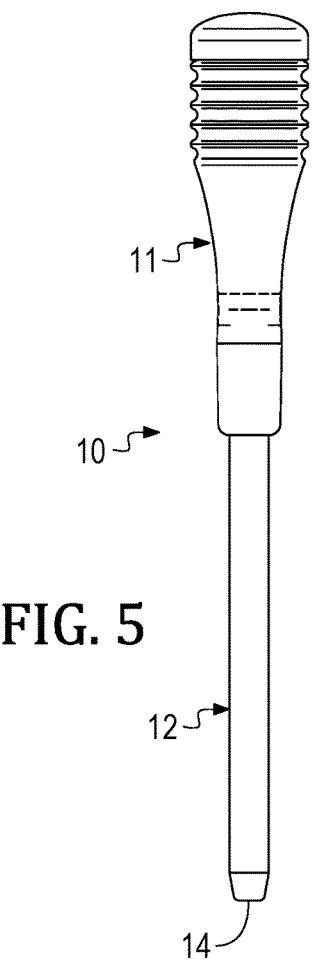
FIG. 5 is a side elevational view of the second embodiment, and, FIG. 6 is a sectional view of the second embodiment.
Figure 6:
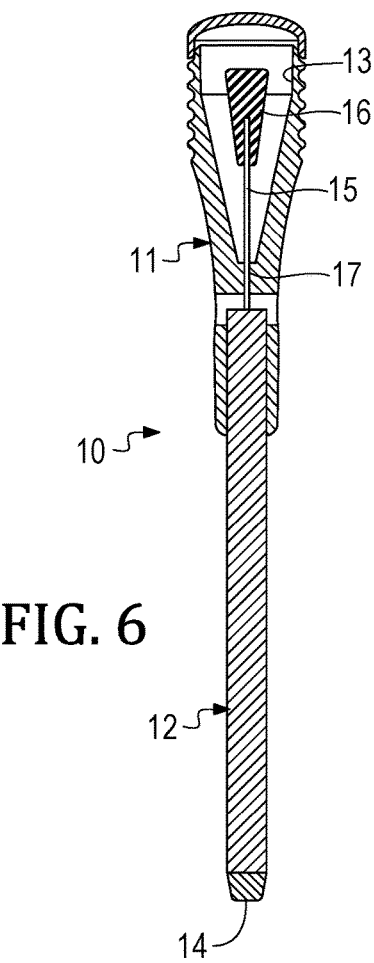

One or more of the above objects can be achieved by providing a secondary vibratory wave source that is consistent with the sound created by the striker and plate of a friction call and which requires no additional effort by the hunter to make the sound or tune the sound. Referring to FIG. 1, it will be noted that the striker 10 includes a striker head 11 or handle that also serves as a counter weight for a wood striker dowel 12 or shaft connected to the head 11. These components are customary in strikers however, the head 11 has an interior well 13 opening in opposition to the tip 14 of the striker 10 as may be seen in FIGS. 2 and 3. Alternatively the well may be closed by a cover as shown in the second embodiment illustrated in FIGS. 4 to 6. The interior well 13 is sufficiently large and deep to accommodate the secondary vibration device which enhances the performance of this striker. As may be seen in FIGS. 2-4 and 6, a length of a somewhat rigid but flexible wire, such as a spring steel wire 15 is imbedded in the head 11 substantially in alignment with the axis of the shaft 12 and extends in opposition to the shaft 12 into the well 13. Wire 15 can be imbedded in the shaft 12 if the shaft extends through a bore 17 in head 11. Distal the connection between the wire 15 and the head 11 or shaft 12, a weight 16 is secured to the wire 15. The weight 16 may be brass or lead or some other relatively dense material that can be welded, soldered or otherwise secured to the wire 15. Weight 16 is referred to as an inertial mass because the inertia of the mass is such that it affects the movement of the wire 15 and the tip of the shaft.

Weight 16 is preferably generally uniform in shape and is sized to fit within well 13 with ample clearance from the sides of the well such that it does not contact the sides of the well at any time. Spring steel wire 15 is sufficiently rigid to prevent the weight 16 from displacing toward and impinging on the walls of well 13. However, spring steel wire 15 also transmits the vibration from shaft 12 to weight 16. Wire 15 thus undergoes multiple vibration states as it transmits energy to the initially stationary weight 16 and then absorbs energy from the weight 16 as the weight's inertial vibration is dampened as the energy flow from the striker movement is diminished. The vibration of the striker tip 14 is transmitted to the weight 16 via the spring steel wire 15. Once the weight 16 starts vibrating, the vibratory force of the weight's vibration is radially perpendicular to the axis of the striker shaft 12, which in turn causes the tip 14 of the striker to stutter across the slate surface. Thus, the inertia of the weight 16 as it changes direction causes the tip 14 to tremble on the surface. The physics term is constructive interference, were the initial vibration of the striker tip is amplified by the vibration of the weight. The result is the addition of a slight tremble or tremor vibration to the rasping vibration obtained with the striker and plate alone yielding what is considered to be a more life-like reproduction of turkey yelps and purrs. Thus, thus the constructive interference also has a desirable effect on the tonal frequency of the call and striker.

It should be understood that the striker shaft 12 is preferably made from wood, however, other materials such as graphite and composites have been used for shafts and could be utilized with the present invention. Likewise head 11 is preferably a cast resin composition, but the head may be made from any conventional material such as wood or plastic. The spring steel wire 15 serves to hold the weight 16 in the proper position and to transmit vibration to and from the weight, however, other resilient materials besides spring steel may be suitable for use without departing from the scope of the present invention. Likewise, weight 16 may be of any suitably dense material that will sustain the vibration transmitted to it by the striker. While such materials are generally may also be suitable.

It will be understood that variations in the stiffness, diameter and length of the wire 15 will create different vibratory properties as will a variation in the weight and density of the weight 16. Likewise, although weight 16 has been shown in a barrel shape, the weight may be disk-shaped, rod-shaped, cross shaped or fork like depending on the material chosen and the tonal qualities desired.

While in the foregoing specification this invention has been described in relation to certain embodiments thereof, and many details have been put forth for the purpose of illustration, it will be apparent to those skilled in the art that the invention is susceptible to additional embodiments and that certain of the details described herein can be varied considerably without departing from the basic principles of the invention.

I claim:

1. An improved striker having a shaft for engagement with a friction call body to create a vibration mimicking an animal call wherein the improvement comprises: a head mounted to said shaft and defining a wall about an axially opening well there within, a mass supported on a rigid wire member extending within said axially opening well in non-contacting relation to said wall such that said mass is free to vibrate in response to engagement of said shaft with said friction call body.

2. An improved striker as defined in claim 1 wherein said wire member extends axially.

3. An improved striker as defined in claimed 1 where said mass is an inertial mass as compared to said rigid wire member.

4. An improved striker as defined in claim 1 wherein said mass is sufficient to create constructive interference, where the initial vibration of the striker shaft moving across said friction call body is amplified by the vibration of the mass.

5. An improved striker as defined in claim 1 wherein said mass is connected to said shaft by a rigid wire member extending within said axially opening well.

6. An improved striker as defined in claim 1 wherein said mass is connected to said head by a rigid wire member extending within said axially opening well.

7. An improved striker for engagement with a friction call body to create a vibration mimicking an animal call comprising: an elongated shaft having a tip on one end; a head mounted to said shaft on an end opposite said tip and forming an axially opening well there within, a mass mounted within said well in non-contacting relation to said well such that said mass is free to vibrate in response to engagement of said tip with said friction call body thereby creating constructive interference such that the initial vibration of the striker tip is amplified by the vibration of the mass.

8. An improved striker as defined in claim 7 wherein said mass is supported on a rigid wire member extending within said axially opening well.

9. An improved striker as defined in claim 7 wherein said mass is connected to said shaft by said rigid wire member extending within said axially opening well.

10. An improved striker as defined in claim 7 wherein said mass is connected to said head by said rigid wire member extending within said axially opening well.

11. An improved striker as defined in claim 7 wherein said mass is a dense material selected from the group consisting of metals, composite materials and ceramic materials.

12. An improved striker as defined in claim 7 wherein said mass is made of any suitably dense material that will sustain vibration transmitted to it by the striker.

13. An improved striker as defined in claim 12 wherein said mass is supported on a rigid wire member extending within said axially opening well.

14. An improved striker as defined in claim 13 wherein said mass is a dense material selected from the group consisting of metals, composite materials and ceramic materials.

15. An improved striker as defined in claim 14 wherein said wire member extends axially.

16. An improved striker as defined in claim 9 wherein said constructive interference has a desirable effect on the tonal frequency of the striker and call.

* * * * *